United States Patent
Upadhyay et al.

(10) Patent No.: US 10,173,912 B2
(45) Date of Patent: Jan. 8, 2019

(54) WATER QUALITY DETECTION, SEPARATION AND RECYCLING SYSTEM AND METHOD

(71) Applicants: Shivani Upadhyay, Fremont, CA (US); Varun Upadhyay, Fremont, CA (US)

(72) Inventors: Shivani Upadhyay, Fremont, CA (US); Varun Upadhyay, Fremont, CA (US)

(*) Notice: Subject to any disclaimer, the term of this patent is extended or adjusted under 35 U.S.C. 154(b) by 58 days.

(21) Appl. No.: 15/369,377

(22) Filed: Dec. 5, 2016

(65) Prior Publication Data
US 2018/0057379 A1 Mar. 1, 2018

Related U.S. Application Data

(60) Provisional application No. 62/379,894, filed on Aug. 26, 2016.

(51) Int. Cl.
| C02F 3/00 | (2006.01) |
|---|---|
| C02F 3/32 | (2006.01) |
| C02F 1/32 | (2006.01) |
| C02F 103/00 | (2006.01) |

(52) U.S. Cl.
CPC .............. *C02F 3/006* (2013.01); *C02F 3/327* (2013.01); *C02F 1/325* (2013.01); *C02F 2103/002* (2013.01); *C02F 2201/005* (2013.01); *C02F 2209/005* (2013.01); *C02F 2209/02* (2013.01); *C02F 2209/06* (2013.01); *C02F 2209/11* (2013.01); *C02F 2301/043* (2013.01); *C02F 2303/04* (2013.01)

(58) Field of Classification Search
CPC ................ C02F 1/325; C02F 2103/002; C02F 2201/005; C02F 2209/005; C02F 2209/02; C02F 2209/06; C02F 2209/11; C02F 2303/04; C02F 3/006; C02F 3/327; C02F /

See application file for complete search history.

(56) References Cited

U.S. PATENT DOCUMENTS

| 4,349,436 | A | 9/1982 | Kaump |
|---|---|---|---|
| 4,924,536 | A | 5/1990 | Houghton |
| 5,274,861 | A | 1/1994 | Ford |
| 5,528,856 | A * | 6/1996 | Smith .............................. 47/59 |
| 8,521,335 | B2 | 8/2013 | Gutierrez-Wolf et al. |
| 2003/0111424 | A1* | 6/2003 | Rosen ..................... C02F 1/008 210/743 |
| 2012/0060932 | A1* | 3/2012 | Gutierrez-Wolf ....... E03B 1/044 137/2 |

* cited by examiner

*Primary Examiner* — Dirk R Bass
(74) *Attorney, Agent, or Firm* — Thomas Schneck

(57) ABSTRACT

A water conservation and recycling system where an integrated automated system comprising a sensor housing with at least one sensor, a diverting valve and controller, the system used to separate water based on quality parameters (for example, temperature, acidity (pH), dissolved oxygen, electrical conductance and/or turbidity). In one example, physical bio-filtration is used to remove debris particles from clean water and ultraviolet light and ionization is used for bacterial eradication of clean water. Separated clean water is stored and recycled for agriculture and toilet purposes resulting in up to 40% reduction in residential and commercial water consumption. Municipal water supply line pressure is used to pressurize storage tanks to provide intermittent irrigation water supply.

2 Claims, 3 Drawing Sheets

WATER QUALITY DETECTION, SEPARATION AND RECYCLING SYSTEM AND METHOD

CROSS-REFERENCE TO RELATED APPLICATION

This application claims priority under 35 U.S.C. 119(e) from U.S. provisional application Ser. No. 62/379,894, filed Aug. 26, 2016 which is hereby incorporated by reference.

TECHNICAL FIELD

The present invention relates in general to water recycling, and more specifically to water quality detection, water separation and water recycling systems and methods.

BACKGROUND ART

Although most of our planet is covered in water, we are only able to drink and use 1% of it. As the various industries and the United States' population continue to grow, more pressure is put on being able to conserve that 1% of water. By 2025, it is predicted that an average of 2 billion people will find themselves living in severe water scarcity conditions. The United States has been fortunate that its fresh water sources can be easily accessed. However, instead of taking advantage of this fact, people have chosen to be extremely wasteful. By dumping chemicals, untreated sewage, and other wastes into our lakes, streams, and rivers, they have spoiled these water sources. While our clean fresh water supply is shrinking, the treatment of more supplies will be costly. In order to keep these costs to a minimum, we all must conserve this precious resource. Not only are spoiled freshwater sources the issue, several states in the U.S., with California serving as a prime example, are suffering from drought. If these states with drought conditions were able to conserve their water, they could use water saving to complete other necessities that water fulfills, including, but not limited to: cleaning, cooking, irrigating, and electricity. All in all, water is a limited resource necessary to sustain life, and the wise option would be to conserve it.

The term water recycling is generally used synonymously with water reclamation and water reuse. Recycled water can satisfy most water demands, as long as it is adequately treated to ensure water quality appropriate for the use. Gray or dirty water is generally defined as water that contains solid residue, bacteria and chemicals which is allowed to empty down the drain pipes of wash basins, tubs, and showers after being used for washing or rinsing, and that is ordinarily discarded and allowed to flow from the drain pipe into a sewer line. Gray water, can be reusable. Clean but non-potable water is defined as residue and bacteria free and chemically pH (power of hydrogen) neutral. In general people believe in water conservation and limit their water use by either employing gray water systems within their homes or using other means such as buckets to collect wasted water and reuse in irrigation purposes. However, such endeavors require a change in daily habits of people, are cumbersome, expensive and have many moving parts such as pumps used in gray water recycling system. This invention addresses these issues and provides a simple automated water recycling and conservation solution that does not require a change in daily habits.

Currently both clean and gray water from the sink or bathrooms or other drains in households is directly sent to city drainage/recycle recovery water lines as this water is considered dirty or gray. Sometimes gray water technology is used where gray water is directed to a storage tank after filtration and ultraviolet light is used to disinfect the water. This water is then used for agriculture and irrigation purposes. Recycling of gray water for irrigation must comply with city, state and federal regulations. In traditional gray water recycling, water from the shower, bathtub and laundry are filtered to remove debris particles and disinfected using ultra violet light and ionization so that the water can be re-used for landscape irrigation. However, current gray water systems have many drawbacks including being expensive to install, containing moving parts, and diminishing sewage flow as all gray water is locally stored. Current gray water systems require constant maintenance and, if not filtered and cleaned properly, can cause disease or contamination. Further, by law one cannot store gray water for more than 24 hours as gray water may contain fats, oils, grease, hair, lint, soaps, cleansers, fabric softeners, and other harmful chemicals. This can present a problem over a period of time when gray water is used for irrigation. Also, cleaning agents present in gray water contain sodium salts which can create an alkaline condition and damage the soil structure. Thus, a main issue with gray water recycling is that it does not distinguish between clean water and dirty water, for e.g., during showers.

For example, in every household approximately 40% of the time clean water is wasted as gray water even though there is no contamination of gray matter. For example, in a home connected to a current gray water system, clean water flowing through, for example a bathroom sink, will be collected in the same storage tank that contains soapy water. In another example, during teeth brushing, clean water kept running without any use is directed to the city drain as gray water. Another example is during a shower, where up to 5 gallons of clean water is wasted simply by waiting for water to turn hot. Thus, there is a need for a method or system to separate contaminated (e.g. soapy water) from clean water during such uses as described above. It has been shown in various reports that people will perform conservation for longer periods if a change is habits is not required. Thus there is a need for automated, water conservation and recycling system that does not require a change in habits such as stopping water flow during teeth cleaning.

In order to address above issues, Gutierrez-Wolf et al., (U.S. Pat. No. 8,521,335) employ a series of chemical and temperature sensors to determines the acceptability of gray water for irrigation purposes. Based on a preset threshold of acceptability of chlorine chemical concentration (200 parts per million) and temperature level, water is directed to either public sewage system or irrigation pipe using a three-way diverting valve. However, this invention has a narrow definition of clean water as it is based on a singular parameter such high or low concentration of chlorine or high or low temperature level. This approach does not address the critical interdependent relationship between the chemical concentration (of chlorine) and temperature that can provide false threshold causing incorrect opening of a three-way valve and mixing of dirty and clean water. Thus, this lack of relationship can introduce dirty gray water into the irrigation pipe defeating the purpose. Further, this approach does not address bacteria and residue contamination of water that will be directed into the irrigation pipe. Thus, there is a need for an integrated and complete water recycling system that makes sure water is not only chemically clean and pH neutral but also free from bacteria and residue before being directed for recycling purposes such as irrigation.

U.S. Pat. No. 4,924,536 to Houghton, entitled "System of Conserving Water in a Building" and issued May 15, 1990, is a manually operated system to conserve cold water that is normally wasted while a user is waiting for hot water to come out. This water is stored for use by a toilet. This is technically not a "gray" water conservation system, as the water reused never passed through a drain.

U.S. Pat. No. 4,349,436 to Kaump, entitled "Grate and Water Recovery System" and issued Sep. 14, 1982, details a self-cleaning grate and a storage tank that automatically fills either with gray water or with fresh water, if gray water is not available. Water is pumped on demand from the tank for use by a toilet.

U.S. Pat. No. 5,274,861 to Ford, entitled "Gray Water Recycling System" and issued Jan. 4, 1994, provides a gray water recycling system that can conveniently direct gray water from a fixture such as a wash basin, sink, tub, or shower to a holding tank or the like by replacing the fixture's existing drain pipe with a drain pipe valve assembly that is operable between a drain condition, in which water from the fixture is allowed to flow down the drain pipe into the sewer line, and a recycle condition, in which the water is blocked from flowing into the sewer line and instead is allowed to flow into a holding tank line and ultimately to the holding tank.

Thus, none of current water recycling methods and apparatus are capable of providing a residue free, bacteria free, pH neutral and chemically neutral water for recycling purposes. It is therefore an object of the present invention to provide a new and improved system and method for recycling water.

It is another object of the present invention to provide a new and improved system and method for detecting water quality and separating and recycling water.

SUMMARY OF DISCLOSURE

These objects, as well as others, have been achieved with a method and system for separating clean water from dirty water in real time at the source. In one embodiment, the system comprises a sensor housing/tank having an inlet in fluid communication with a drain through which drain water flows, an outlet for releasing drain water and at least one drain water sensor sensing at least one drain water characteristic which is output as data; a controller which receives the drain water sensor data and generates a first signal having a first state if the data is indicative of clean water and generates a second signal having a second state if the data is indicative of dirty water; a diverting valve in fluid communication with the sensor housing and positionable to either a first position or a second position, the position of the diverting valve controllable by the controller; a clean water tank, wherein if the first signal is generated then the diverting valve is positioned in the first position in fluid communication with the clean water tank thereby diverting clean water to the clean water tank and if the second signal is generated then the diverting valve is positioned in a second position thereby diverting dirty water to a location other than the clean water tank.

In one embodiment, the method comprises providing a sensor housing/tank having an inlet in fluid communication with a drain through which drain water flows, an outlet for releasing drain water and at least one drain water sensor sensing at least one drain water characteristic which is output as data; providing a controller receiving the drain water sensor data and generating a first signal having a first state if the data is indicative of clean water and generating a second signal having a second state if the data is indicative of dirty water; providing a diverting valve in fluid communication with the sensor housing and positionable to either a first position or a second position, the controller controlling the position of the diverting valve; providing a clean water tank, wherein if the first signal is generated then positioning the diverting valve in the first position in fluid communication with the clean water tank and diverting clean water to the clean water tank and if the second signal is generated then positioning the diverting valve in a second position diverting dirty water to a city drain or other location.

Some advantages of the invention are that it allows for saving of up to 40% of water that can be used for irrigation and it reduces the amount of energy needed at the city recycling plants due to less gray water arriving. The integrated automated system separates water based on one or more qualities or characteristics (e.g. temperature, acidity (pH), dissolved oxygen, and/or electrical conductance). Physical bio-filtration is used, in one example, to remove debris particles and ultraviolet light and ionization for bacteria eradication and using fast growing grass based bio-filter to remove debris.

DETAILED DESCRIPTION

Figure 1:
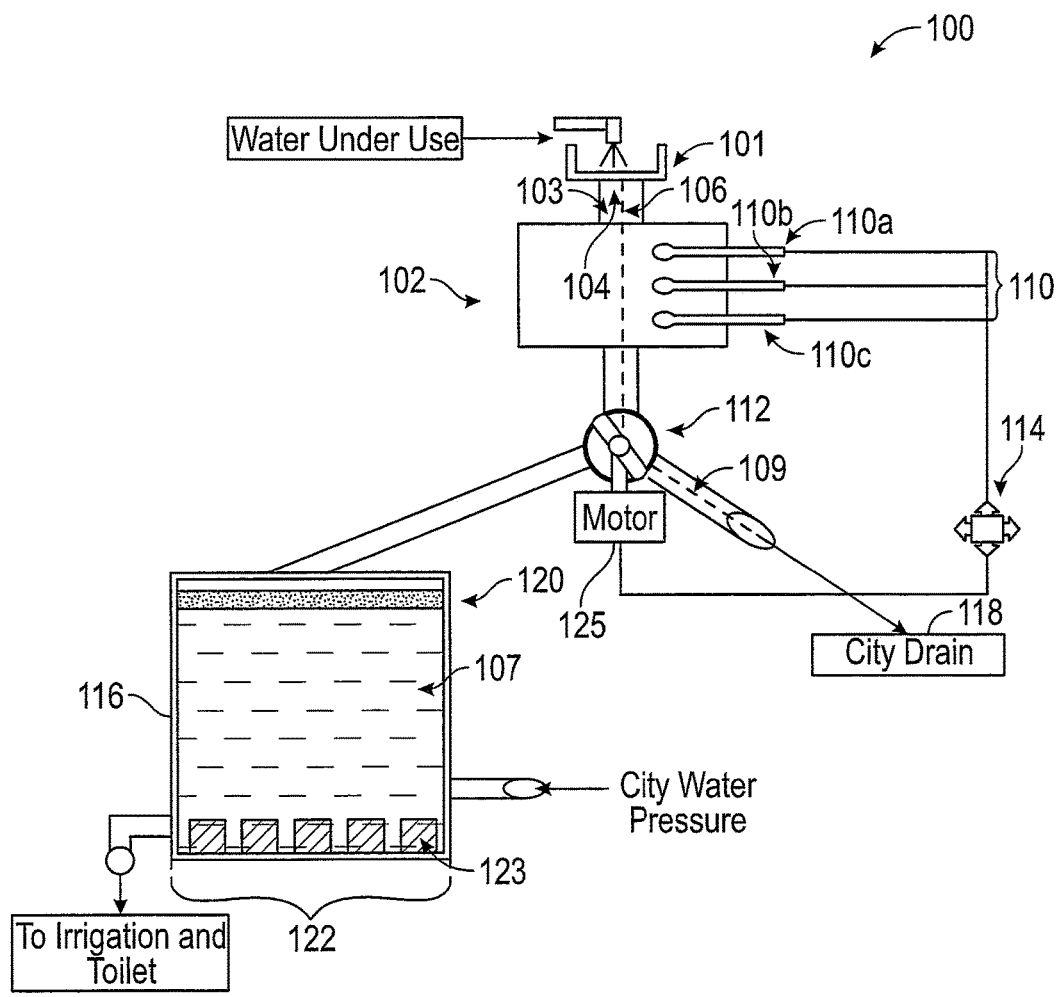
FIG. 1 is a plan view of an integrated water separation and recycling system with a diverting valve in a first position diverting dirty water to a city drain.

With reference to FIG. 1, there is seen an integrated water separation and delivery system 100 of the present invention. In this example, a bathroom sink 101 is used to demonstrate the function of the system. In other examples, the system of the present invention is integrated with showers or other types of sinks or drains. The system includes a sensor tank or housing 102 housing one or more sensors 110$n$ of a sensor system 110 and located under the sink 101, a diverting valve 112 in communication with a control system/controller 114, the controller including a logic board/logic array, a water tank 116 with a filter such as bio filter 120 attached to collect clean water and an ultraviolet light system 122 having ultraviolet light sources 123 to kill unwanted bacteria in collected water. Drain water 106 passes through a drain 104 into an inlet 103 of the sensor housing 102 where one or more sensors 110$n$ senses a water characteristic. The controller 114 receives sensor data and generates a first signal having a first state if the sensor data is indicative of clean water and generates a second signal having a second state if the sensor data is indicative of dirty water. One or more sensors 110$n$ sensing various characteristics which are output as data that may be used in the generation of the first and second signals having first and second states. If the first signal having a first state is generated, the controller 114 positions the diverting valve 112 to allow for movement of the water to the clean water tank 116 (FIG. 2) and if the second signal having a second state is generated, the controller 114 positions the diverting valve 112 to allow for movement of the water to a different location such as the city drain 118 (FIG. 1). Stored water 107 of the clean water tank is sufficiently clean to use in home irrigation system. Without the use of this invention system, all the water 106 flowing through the drain 104 would have previously gone to the either the city drainage or to a prior art gray water collection system, if installed.

Figure 2:
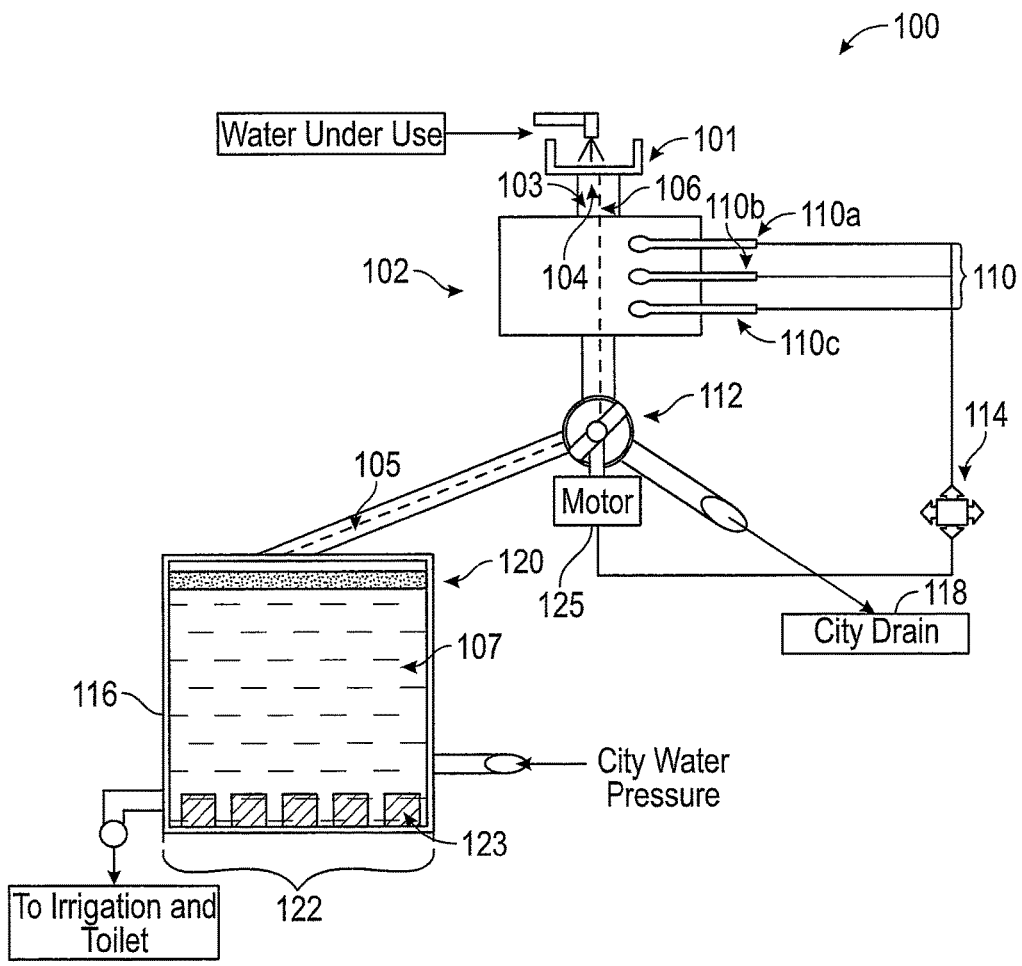
FIG. 2 is a plan view of an integrated water separation and recycling system with a diverting valve in second position diverting clean water to a clean water storage tank.

Sensor System:

One or more water characteristic sensors may be used to characterize the drain water as either clean or dirty water. In one embodiment, a pH sensor 110a alone is used to determine whether water should be classified as clean or dirty. When used water 106 enters the sensor housing 102 from drain 104, pH sensor 110a measures the pH value of the water. If the pH data it is not within assigned limits (preferably 6.8-7.1), the sensor 110a provides sensor data input to the logic array of the controller 114 which generates a signal to position the diverting valve 112 to divert all the water 109 to city drainage system 118. If the water that enters into the sensor system has a pH value within the assigned limit (6.8-7.1), the sensor provides sensor data input to the logic array of the controller 114 which generates a different signal to position the diverting valve 112 to divert all the water 105 towards the clean water tank 116 as seen in FIG. 2. Water 105 passes thru a bio-filter 120, or other filter, to remove any hair or solid residue. Water 105, characterized as clean water, is stored in the clean water tank 116 and ultraviolet light from an ultraviolet light source 123 is used to kill any bacteria present in the water.

In one embodiment, a combination of sensors is used to determine whether the drain water 106 is clean or dirty. In one example, all sensors must sense water characteristics indicative of clean water in order for the logic array to generate a first signal having a first state indicative of water having clean water characteristics. If one of the sensors does not output data indicative of clean water, the logic array generates a second signal having a second state indicative of water having dirty water characteristic. In one example, three sensors, for example, the pH sensor 110a, a temperature sensor 110b, and turbidity sensor 110c are used to determine whether the drain water 103 is clean or dirty. The first sensor the water reaches is the pH sensor 110a. This sensor scans/senses the drain water 106 and detects the pH value. For the pH sensor, in one example, the value of the water must be between 6.8 and 7.2, the average pH value range of clean drinking water. If the water doesn't have a value between the set number range, it is not considered to have characteristics of clean water and the logic array will indicate this. In another example, the range of pH may be broader than the pH value range of clean drinking water because after temperature calibration as described below, the true pH may fall within the average pH value range of clean drinking water.

After the pH sensor test, the water then flows to the temperature sensor 110b which is also located within the same sensor housing or tank 102. The temperature sensor 110b provides the next test of the water's cleanliness. This sensor is for making the pH value more accurate. According to the Le Chatelier's Principle, as water temperature increases, the pH value will decrease. In this principle, if you make a change to the conditions of a reaction in dynamic equilibrium, the equilibrium will move to counter the change, and will do so by absorbing heat. This means that more hydrogen ions and hydroxide ions will be formed. The resulting effect is the increase of the value of KW, or the ionic product of water. The pH versus temperature relation of a pH sensor is described, according to Nernst equation, with the following equation:

$$E = E0 - kT \cdot pH$$

The slope factor of the equation, "kT", will change when temperature changes. And that means the millivolt output of the pH electrode will change with temperature. For example, if the temperature of the water was zero degrees Celsius, the formula would yield a result $0.114 \times 10^{-14}$, which equals the pH accurate value of 7.47, which is slightly basic, but within the range of the average clean drinking water with the minerals.

After this temperature test, comes the turbidity test, which measures how clean the water is. Turbidity is the cloudiness or haziness of a fluid caused by large numbers of particles in the water. Turbidity is the most important aspect of checking the water quality. The turbidity sensor 110c works by measuring the amount of light that is transmitted through the water, which determines if the water is clean or not. A specified maximum turbidity level may be used in determining whether the water is characteristic of clean water.

In one example, the water 106 from the drain 104 must have passed each of the pH, temperature and turbidity sensor tests, i.e. the water characteristics must fall within the specified range or be a specified value, in order for the logic array to indicate that the water is indicative of clean water. In another embodiment, a combination of quality parameters (temperature, acidity (pH), dissolved oxygen, electrical conductance and turbidity) can be used to characterize and separate water into clean water and dirty water and direct the water to either the clean water storage tank 116 or another location such as the city drainage system 118.

Control system/controller 114 may comprise commercially available logic arrays and sensor inputs. Control system/controller 114 is used to acquire and process the data. Input from various sensors in the sensor housing 102 is processed by the control system/controller 114 and assigned a value of either 1 or 0. Here, a value of 1 represents a finding of clean water based on sensor inputs, in which case the control system/controller 114 positions the diverter valve 112 into a first position such that the valve diverts water 105 (characterized as clean) towards the clean water storage tank 116 by moving the motor driven diverted valve, as seen in FIG. 2. A value of 0 represents a finding of dirty water based on sensor inputs, in which case the control system/controller 114 positions the diverter valve 112 into a second position such that the valve diverts water 107 (characterized as dirty) towards the city drainage system 118 by moving the motor driven diverted valve, as seen in FIG. 1. Electric motor 125 or a pneumatic driven opening and closing of the diverter valve 112 operate at high frequency up to kHz to separate incoming water from sinks, showers, drains and other sources in real time based on sensor inputs.

Figure 3:
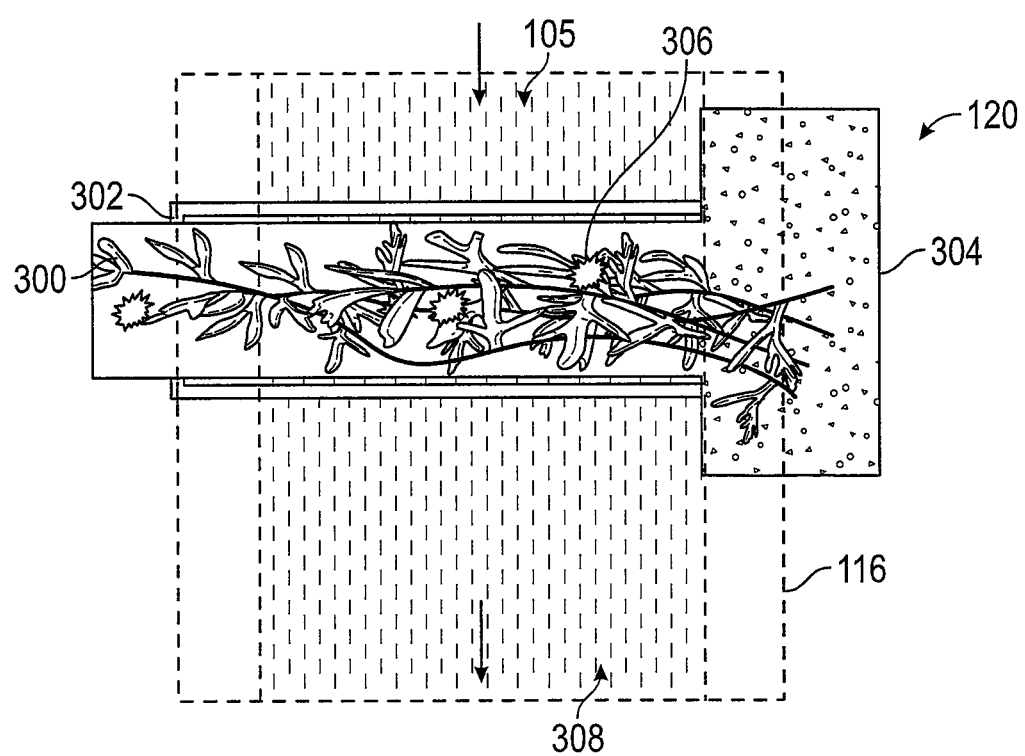
FIG. 3 is a detailed view of a bio-filtration system of FIGS. 1 and 2.

Bio-filter Systems:

Once at the clean water tank 116, water 105 (previously characterized as clean water) will flow down a filter such as ecofriendly bio-filter 120 (FIG. 1) which operates by using a leafy hydroponic plant 300 as depicted in detail in FIG. 3. In one example, the plant is preferably hornwort. This plant 300 may be contained inside a tube or filter casing 302 made of carbon fiber or plastic which has holes on the top and bottom (not shown). On the side of the tank will be a pot of sand or soil 304 which will be where the plant grows as seen in FIG. 3. As the aquatic plant starts hydroponically growing, water from the diverting valve will go through the holes of the casing, and any other excess particles or residue 306 of the water 105 will get caught on the plant's leaves because the leaves have affinity for particles in the water. As the leafy plant continues to grow, the particles continue to move up the plant containment tube 302 where, eventually, its growth leads outside through a port or door where the excess plant is chopped off and the residue/particle retained with the leaves removed. The plant used in this product is most preferably hornwort or similar plant can be used. The scientific name is Ceratophyllum demersum. This is a fast growing aquatic plant that needs little light to thrive. Filtered water 308 exits the bio-filter. This leafy plant as well as other aquatic plants are required for the bio-filter to work. Bio-filter system described here is a key element of this invention.

Ultraviolet Light System in Collection Tank System:

After the non-filtered water 105 flows through the aquatic water plant 300, as seen in FIGS. 2 and 3, filtered water 308 is collected in storage tank 116 where ultraviolet light from ultraviolet sources 123 of an ultraviolet light system 122 is used kill the remaining bacteria. After filtration and UV irradiation, preferably, the clean water can be used for toilets and the irrigation systems. This water should not be used for drinking.

Irrigation System:

In one embodiment, based on water flow and level meters, after filling the storage tank 116 to a certain level, city water 200 can be used to pressurize the tank. Once the system is pressurized, it can be used to deliver water to irrigation system in manner similar to low flow toilets. After the pressure is released, re-pressurization is required. This method results in intermittent water flow for irrigation instead of continuous flow as is the case in traditional irrigation systems. However, this mechanism will deliver irrigation water in an intermittent manner as continuous city water pressurization will be needed. In another embodiment, a low cost traditional water pump is used to deliver water for irrigation purposes.

An example of a method and sequence of water separation based on one embodiment of this invention is described below for water flowing from a bathroom sink based on pH value. Other sensors data can be used in other embodiments of this invention.

1. Water 106 flows through the sink and into the sensor housing/tank and contacts the pH sensor 110a.
2. If water 106 has pH value between 6.9-7.1, diverting valve 112 opens and directs the water 105 (characterized as clean) to the storage tank 116. If the value is below 6.9 or above 7.1, then the diverting valve opens and directs the water to city drainage 118.
3. Once the water 105 reaches the storage tank 116, it passes thru the bio-filter 120 where residue of debris gets collected on the plant 300.
4. Clean water 105 is filtered thru the bio-filter 120 and ultraviolet light source 123 is used to kill bacteria present in the stored water. It will require less energy for ultraviolet light as water is already filtered and lies within a specified pH value range, a benefit of this invention.
5. The stored water tank 116 is also connected to city water line where city water line pressure 200 is used to pressure the tank. Once a certain pressure is reached, an irrigation valve is opened to deliver the water.
6. Once the pressure is decreased, irrigation value is closed and re-pressurization of storage tank occurs. This method provides intermittent water supply for irrigation.
7. Instead of method described in 5-6 for irrigation based on city water pressure, a traditional water pump can be employed.

In one example, as the drain water 106 flows down into the sensor housing 102, the drain water contacts the sensors from the top down. In another example, as the sensor housing 102 fills with drain water 106, the drain water contacts sensors sequentially from the bottom up.

This invention is a simple solution to save up to 40% of non-agriculture water and more than 10% of energy used by wastewater treatment plants. Exemplary configurations described herein are for illustration purposes only and they do not intend to limit the full scope of the possible configurations and combinations that can be achieved following the principles of the present disclosure.

What is claimed is:

1. A drain water separation system capable of integration with showers, sinks and other waste water drains for supplying clean water to city irrigation systems comprising:

A sensor housing having an inlet in fluid communication with a drain through which drain water flows, an outlet for releasing drain water and having a temperature calibrated pH sensor and a drain water turbidity sensor sensing whether drain water is above or below a maximum turbidity level which are output as sensor data;

A controller which receives the drain water sensor data including a first digital signal based upon the temperature calibrated pH sensor being in the range of 6.8 to 7.2 indicative of clean water and a second digital signal based upon the turbidity sensor being below a specified maximum turbidity level, the combined digital signals indicative of clean or dirty water;

A diverting valve in fluid communication with the sensor housing and positionable to either a first position or a second position, the position of the diverting valve controllable by the controller;

A clean water tank, responsive to the diverting valve being positioned in the first position in fluid communication with the clean water tank thereby diverting clean water to the clean water tank, the clean water tank also responsive to the diverting valve being positioned in the second position thereby diverting dirty water to a location other than the clean water tank;

A biofilter in a casing within the clean water tank arranged to receive clean water flowing into the clean water tank and having leafy aquatic plants therein growing in sand within a perforated tube that clean water flows through, with leaves trapping residue and particles in the clean water and having a port for access to the plant growth extending through the port for leaf removal, thereby removing trapped residue and particles from the clean water to filter the clean water;

An ultraviolet light source positioned to expose the filtered water to UV irradiation;

A connection of the clean water tank to a city water line to pressurize the clean water tank to city pressure from the city water line; and An irrigation valve connected to an outlet of the clean water tank and to a city irrigation system responsive to the clean water tank reaching city water line pressure thereby intermittently supplying clean water as irrigation water to the city irrigation system.

2. The system of claim 1 wherein the plants are hornwort.

* * * * *